Aug. 15, 1950 L. T. COOKSON ET AL 2,518,868
VANE TYPE DISCHARGE CONTROL AND COUNTING UNIT
Filed Aug. 4, 1947 6 Sheets-Sheet 1

INVENTOR.
LEONARD T. COOKSON
WALTER G. KLETTKE
BY
ATTORNEY

Aug. 15, 1950 L. T. COOKSON ET AL 2,518,868
VANE TYPE DISCHARGE CONTROL AND COUNTING UNIT
Filed Aug. 4, 1947 6 Sheets-Sheet 2

INVENTOR.
LEONARD T. COOKSON,
WALTER G. KLETTKE
BY
ATTORNEY

Aug. 15, 1950    L. T. COOKSON ET AL    2,518,868
VANE TYPE DISCHARGE CONTROL AND COUNTING UNIT
Filed Aug. 4, 1947    6 Sheets-Sheet 3

INVENTOR.
LEONARD T. COOKSON
WALTER G. KLETTKE
BY
ATTORNEY

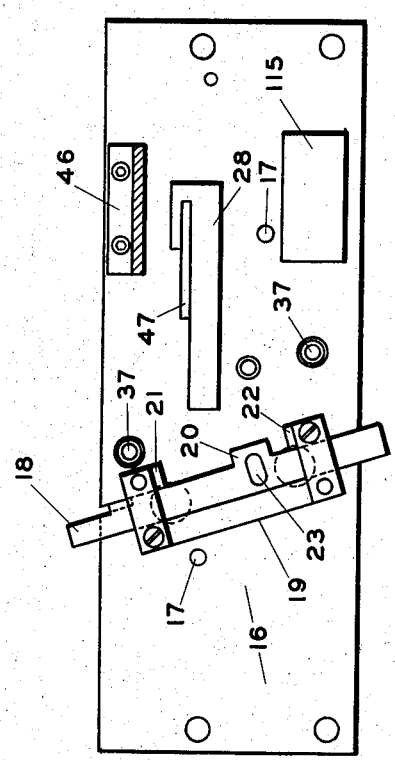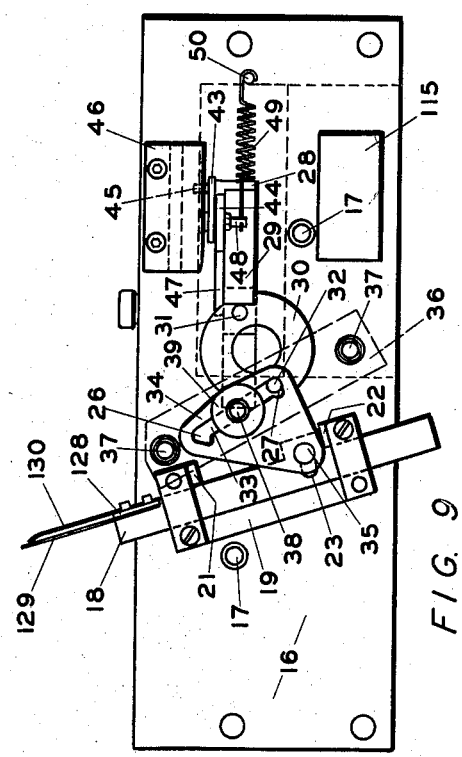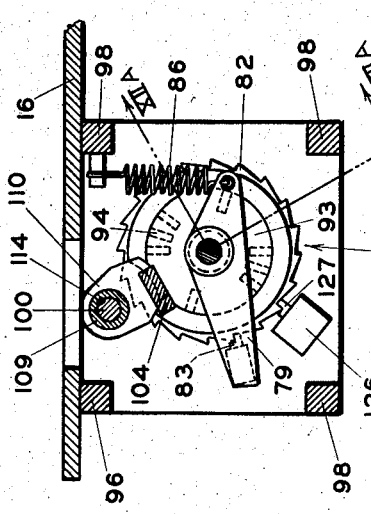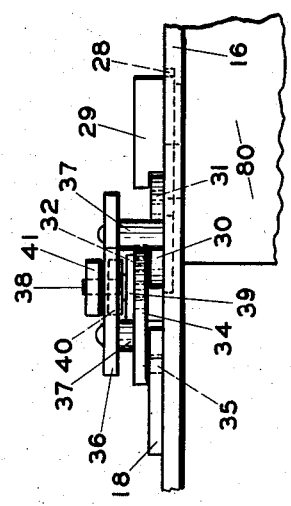
INVENTOR.
LEONARD T. COOKSON
WALTER G. KLETTKE
ATTORNEY Aug. 15, 1950 — L. T. COOKSON ET AL — 2,518,868
VANE TYPE DISCHARGE CONTROL AND COUNTING UNIT
Filed Aug. 4, 1947 — 6 Sheets-Sheet 5

INVENTOR.
LEONARD T. COOKSON
WALTER G. KLETTKE
BY
ATTORNEY

Aug. 15, 1950   L. T. COOKSON ET AL   2,518,868
VANE TYPE DISCHARGE CONTROL AND COUNTING UNIT
Filed Aug. 4, 1947   6 Sheets-Sheet 6
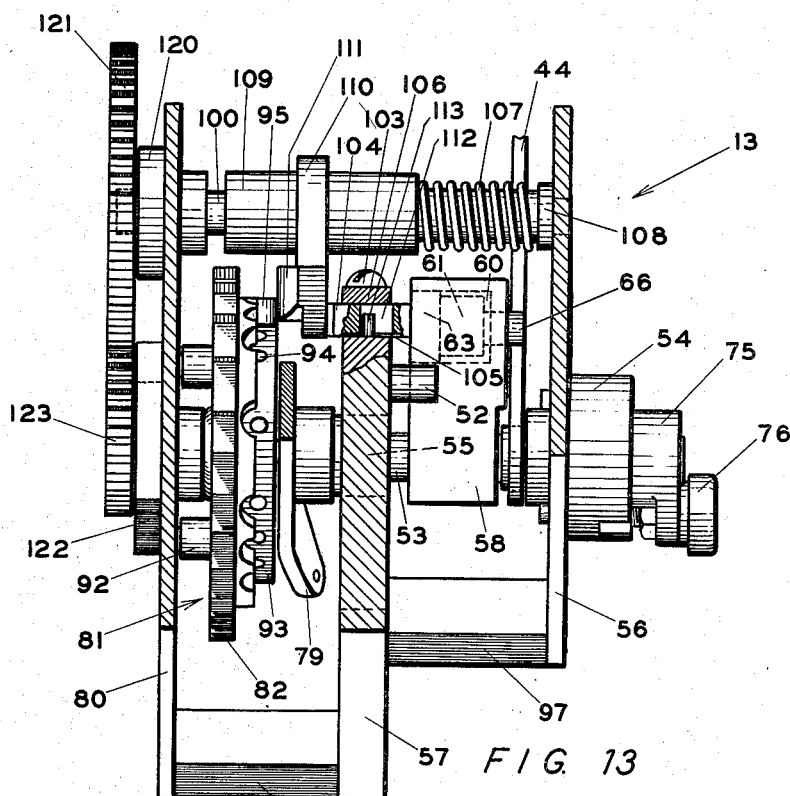
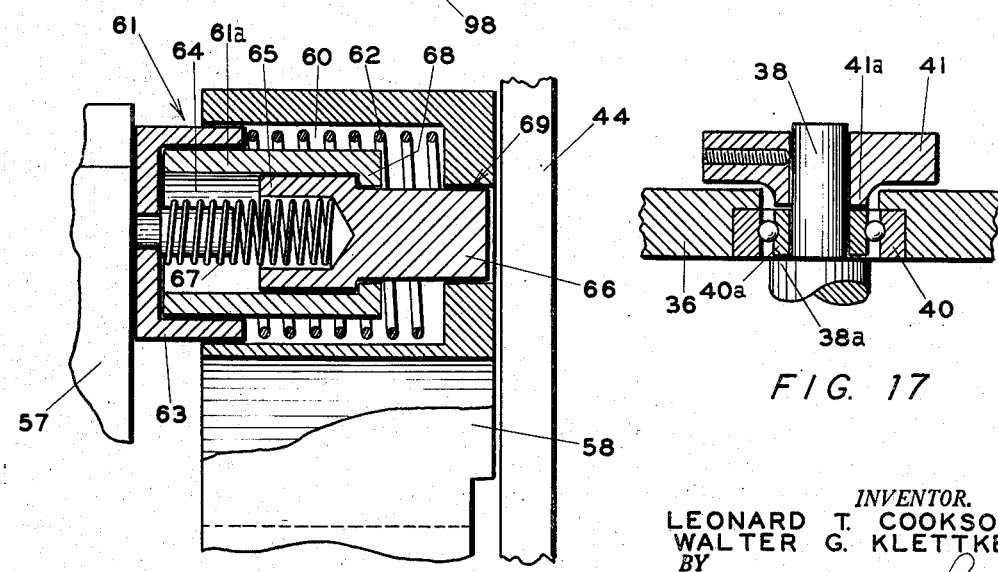
*INVENTOR.*
LEONARD T. COOKSON
WALTER G. KLETTKE
BY
ATTORNEY Patented Aug. 15, 1950

2,518,868

UNITED STATES PATENT OFFICE 2,518,868

VANE TYPE DISCHARGE CONTROL AND COUNTING UNIT

Leonard T. Cookson and Walter G. Klettke, Kalamazoo, Mich., assignors to The Upjohn Company, Kalamazoo, Mich., a corporation of Michigan Application August 4, 1947, Serial No. 765,854

18 Claims. (Cl. 198—68)

This invention relates to a discharge control and counting unit, for use with a power conveyor, and particularly to an improved type thereof which automatically selects and removes objects from a conveyor adjacent to said unit in a predetermined relationship to the movement of the conveyor.

For the purposes of illustration and simplification in terminology, the improved discharge control and counting unit may be referred to as a counting, or accumulating, unit and is disclosed hereinafter as applying to, and cooperating with, a conventional tablet making machine having a revolving table or head upon which tablets are made and carried. It will be understood, however, that such manner of disclosure is selected solely as a convenient medium of illustration and is not intended to impose any limitations whatsoever upon the extent or applicability of this invention.

An earlier model of a discharge control and counting unit, which is disclosed in U. S. Patent No. 2,235,286 and which is the only automatic mechanism known to us which is specifically designed to count tablets as it selectively removes them from a conventional tablet making machine, fails in certain respects to meet the demands placed upon such a mechanism. For example, said earlier model is limited to a maximum count and/or selection of a relatively low number of tablets, 2000 in one embodiment, per movement of the selector arm when used in conjunction with a standard tablet making machine of the said type having a revolving head.

A considerable portion of the selection mechanism, which includes the selecting arm and an associated bell crank lever, is mounted externally of said earlier model. Thus, the said earlier model is both bulky and inconvenient, especially when used in cooperation with a relatively small tablet making machine. Furthermore, that portion of said selection mechanism which is outboard of the counting unit is especially exposed to those conditions, such as vibration and unskilled handling, which are likely to create the need for frequent readjustments.

It appeared difficult, as well as highly impractical, to alter said earlier model successfully and sufficiently to meet present requirements.

It was observed during the development of the improved discharge control and counting unit that even if the counting unit were adjusted as precisely as practicable in actual operations there was an occasional tendency for those parts comprising the selection mechanism of the counting unit to overrun or underrun the theoretical limits of their design, thereby either injuring the unit or failing to effect an operation thereof. In order to avoid underrunning and consequent failure of the counting mechanism to operate the gate shifting or selection mechanism, it seemed desirable to impart a slightly excessive actuation to the input hence to the tripping mechanism in order to insure a positive, complete actuation of the selector bar, or gate shifting mechanism. Therefore, an adjustable release mechanism appeared necessary whereby overrunning of the counting mechanism could be permitted but injury to the selection mechanism would be automatically and positively prevented.

Therefore, it became apparent that an improved discharge control and counting unit was required whereby the objectionable structural features of said earlier model would be eradicated, whereby the limits to which said mechanism can count would be raised or eliminated, whereby injury to the selection mechanism, resulting from overrunning, would be automatically and positively prevented, and whereby the working parts as well as the adjusting and controlling parts would be more readily accessible than corresponding parts on the said earlier model.

Accordingly, it is a primary object of this invention to provide an improved discharge control and counting mechanism which automatically selects and removes objects, such as tablets, from a conveyor, such as the revolving head or table of a conventional tablet machine, in a predetermined relationship to the motion of such conveyor.

A further object of the invention is to provide such a mechanism in which the necessary adjustments in its operational relationship with the conveyor may be easily and accurately made over a wide range of conditions.

A further object of this invention is to provide an improved mechanism as aforesaid which is more compact in structure and less likely to get out of adjustment than those mechanisms for similar purposes which are presently known to exist.

A further object of this invention is to provide an improved mechanism as aforesaid wherein the working parts, particularly the adjusting and controlling parts, are readily accessible while the said mechanism is mounted for operation.

A further object of this invention is to provide an improved mechanism as aforesaid whereby an unlimited number of objects, such as tablets, may be automatically counted as they are removed by said counting means from a conveyor, such as said revolving head of a conventional tablet machine, adjacent to said counting unit.

Other objects and purposes of this invention will become apparent to persons familiar with this type of equipment upon referring to the accompanying drawings and upon reading the following specification.

In order to meet those objects and purposes mentioned above, as well as others incidental thereto and associated therewith, we have provided what may be termed a "vane" type, automatic discharge control and counting unit comprising: a selection mechanism, a counting mechanism and a tripping mechanism.

In the preferred embodiment of the invention herein disclosed, a tripping crank, which is a part of the tripping mechanism, is engaged by a cam, mounted on the side of the revolving head of a conventional tablet making machine, with each revolution of said head. Such engagement produces a partial rotation of said tripping mechanism and an actuation of the counting mechanism whereby the selection mechanism is operated at the proper time. Readily adjustable control means, including a ratchet wheel, a rotating vane and an appropriate gear train, constitute the counting mechanism whereby the said improved automatic discharge and counting unit to which this invention relates is enabled to react accurately with respect to an unlimited quantity of objects, such as tablets, being conveyed near the outer periphery of the head of a conventional tablet making machine adjacent to said counting unit.

The discharge control and counting unit, as hereinafter described, is shown as functioning in close cooperation with a discharge chute means which conveys the said selected tablets from said tablet making machine to suitable containers.

The said preferred embodiment of this invention is illustrated by the accompanying drawings in which:

Figure 4 is a side elevation view of a portion of said counting unit with the cover removed therefrom, said side being that seen from the conveyor table.

Figure 6 is a cross-sectional view of said counting unit taken along the line VI—VI of Figure 12.

Figure 7 is a cross-sectional view of said counting unit taken along the line VII—VII in Figure 12.

Figure 8 is a top plan view of the counting unit with the cover and some of the parts removed.

Figure 9 is a top plan view of the counting unit with the cover and some parts removed, revealing the selection mechanism.

Figure 13 is a cross-sectional view of the counting unit taken along the line XIII—XIII in Figure 5.

Figure 14 is a broken view in partial central-section of a part of the tripping mechanism in the counting unit indicated generally at 61 in Figure 13.

Figure 16 is a side elevation view of the selection mechanism as seen from the back wall, or side opposite the crank of said counting unit.

Figure 17 is an enlarged, sectional view of the support collar and bearing shown in Figure 16.

*General description*

Figure 1:
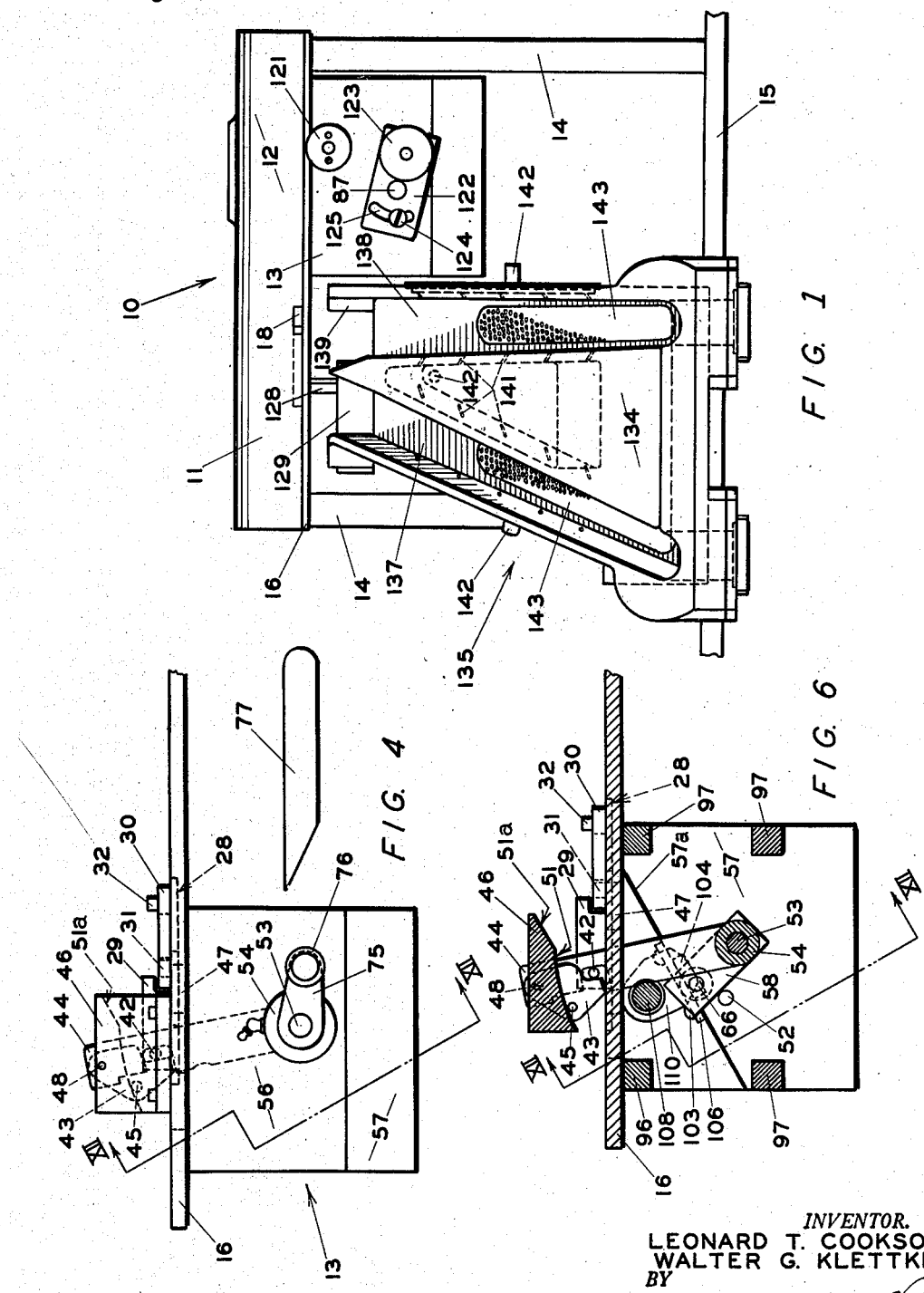
Figure 1 is a side elevation view of said discharge control and counting unit, and the discharge chute means with which said counting unit is preferably associated.

The said improved, automatic discharge control and counting unit 10 as illustrated in Figure 1 is comprised of an upper chamber 11, having a cover 12 suitably shaped from any appropriate material such as sheet metal, and a lower chamber 13. Said counting unit may be supported by any suitable means, such as the unit support rods 14 mounted on a platform 15, which is fixed with respect to the body, or non-moving part, of the conveyor, not shown, with which said counting unit is associated.

Figure 10:
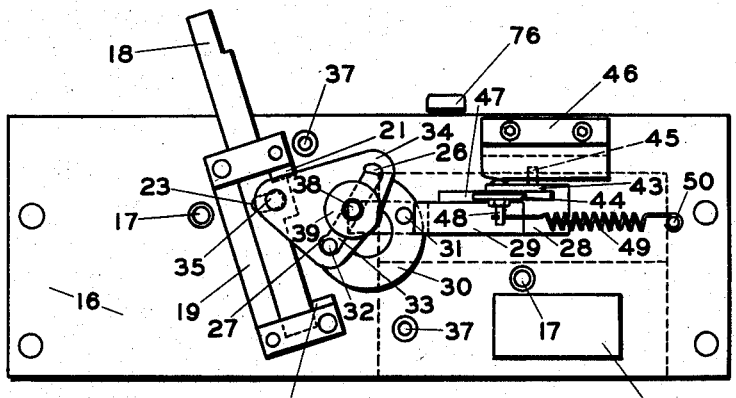
Figure 10 is a top plan view of the counting unit similar to that shown in Figure 9 but showing a part of the selection mechanism in a different position.

The said upper chamber 11 has a base plate 16 (Figures 1, 4, 8 and 9) which is preferably, but not necessarily, made of ¼ inch steel plate, and upon which the discharge control or selection mechanism is mounted. The cover 12 may be held over and around said base plate 16 in proper spaced relation thereto by any suitable means such as the cover supporting rods 17 (Figure 10).

Figure 2:
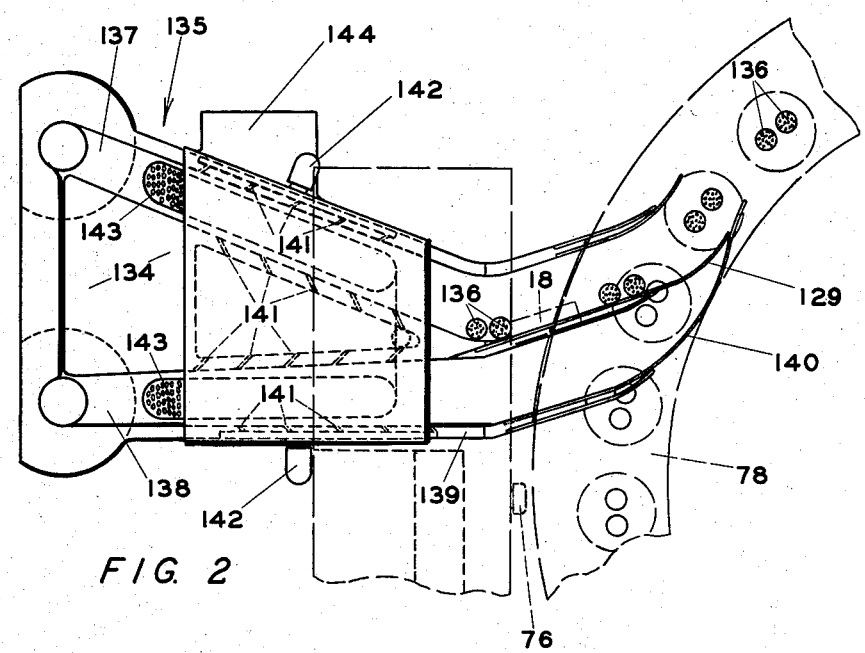
Figure 2 is a top plan view of said discharge chute means with fragments of said counting unit and the revolvable head of a tablet making machine shown in phantom.
Figure 3:
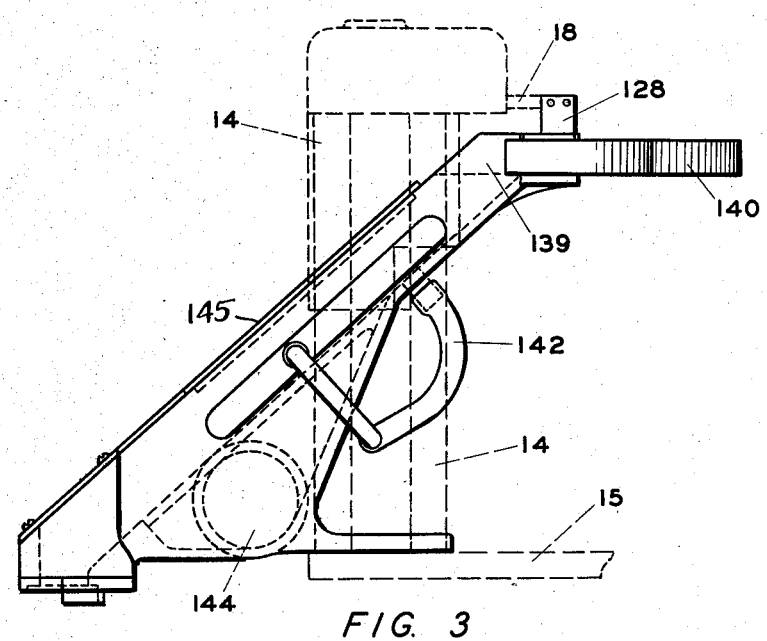
Figure 3 is an end elevation of said discharge chute means with the counting unit shown in phantom.

The selection mechanism is mounted on the upper side of this plate and the counting, or accumulating, mechanism is mounted below it in the lower chamber 13. The whole device is placed alongside of the conveyor with which it is to operate, indicated at 78 in Figure 11, whereby one or more cams 77 on the conveyor will engage the cam roller 76 and trip a crank 75 at predetermined intervals. This crank actuates a suitable counting, or accumulating, mechanism, hereinafter to be described in detail, within the lower chamber 13. When the crank has been actuated a predetermined number of times, the counting mechanism causes the tripping mechanism to operate the selection mechanism by which the selector arm 18 is caused to operate the gate 129 (Figure 2). Thus, whether the said gate is extended or retracted, the tablets 136 carried on the rotating table 78 are caused to go into the chute 137 or the chute 138 (Figure 2) and accordingly be delivered to one container or another as such are placed at the discharge ends of said chutes. Suitable dust collection means are preferably associated with said chutes for removing loose dust clinging to and entrained by said tablets as they pass down the chutes.

Attention will now be directed toward the individual mechanisms by which these operations are conducted.

The selection mechanism

The selector bar 18 (Figures 8 and 9) is reciprocably mounted, by means of the selector bar guide 19, upon the base plate 16 towards the leftward end thereof as appearing in Figures 1, 8, 9, 10, and 11. Although said selector bar 18 is illustrated as reciprocable in a line diagonal with respect to the longitudinal axis of said base plate, it will be understood that without departing from the scope of the invention, said selector bar may be positioned for other directions of operation as desired, within the allowable limits of satisfactory operation.

Said selector bar 18 may have an integral stop 20 which extends from said selector bar, intermediate of the extremities thereof, for engagement by the properly spaced guide bar stop blocks 21 and 22 associated with the opposite ends of said selector bar guide 19, and by means of which said selector may be limited as to the direction and extent of its reciprocation. An elongated opening 23 (Figure 8), whose longitudinal axis is substantially perpendicular to that of the said selector bar 18 is provided therein, adjacent to said integral stop 20. Said selector bar guide may be secured to said base plate 16 by any suitable means such as bolts or screws.

The upper surface of said base plate 16 is provided with a longitudinally elongated guide recess 28 (Figure 8) which extends towards the rightward end of said base plate from approximately the midpart thereof. A connecting block 29 (Figure 9) is reciprocably retained within said elongated recess 28 so that its reciprocating motion is lengthwise of said base plate 16.

Figure 5:
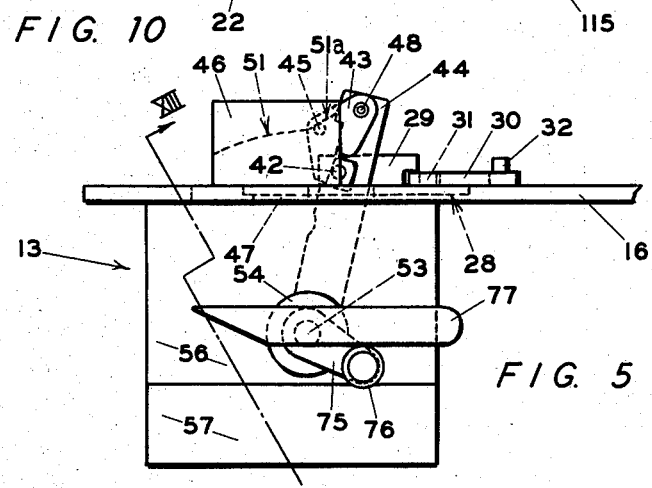
Figure 5 is a side elevation view of a portion of said counting unit similar to that shown in Figure 4 but showing a portion of the selection mechanism and the operating cam in a different position.
Figure 11:
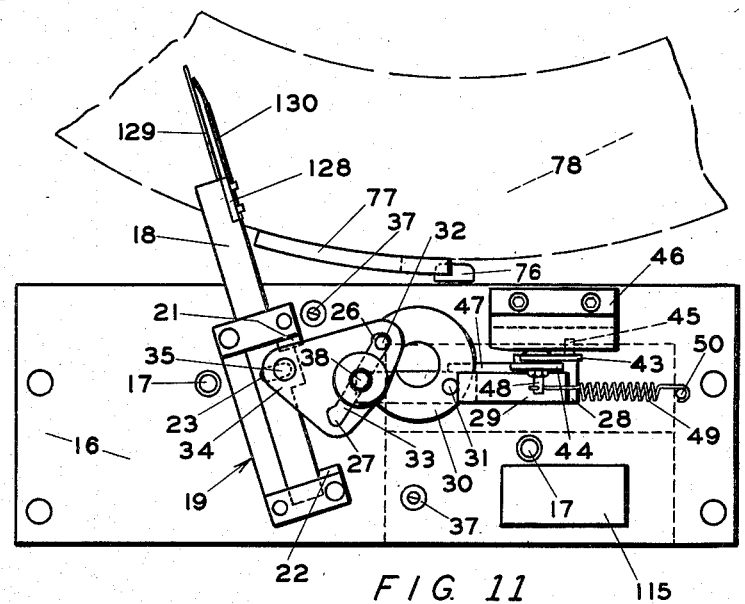
Figure 11 is a top plan view of the counting unit with its cover and some parts removed illustrating the relationship between the said selection mechanism and a tablet making machine.

That end of said connecting block 29, nearest to said selector bar 18, pivotally engages one edge of a metal connecting ring 30 by means of a vertical block pin 31, arranged between said parts, but preferably affixed to said connecting block. That portion of said block 29 engaging said ring 30 is advantageously level with the top surface of said base plate 16 so that said ring 30 is supported by said base plate (Figures 5 and 16). A vertical ring pin 32 is affixed to said connecting ring 30, diametrically opposite to the opening into which said vertical block pin 31 is pivotally received. Said ring pin 32 slidably engages a swivel plate slot 33 in a triangular swivel plate 34 (Figures 9, 10 and 11) which slot is substantially parallel with that side of said triangular plate opposite the corner from which the swivel plate pin 35 depends into sliding and pivotal association with said elongated opening 23 in said selector bar 18. The forward extremity 26 and rearward extremity 27 of the swivel plate slot 33 may be enlarged slightly, as shown in Figures 9, 10 and 11, to provide means for more positive engagement between said extremities and the ring pin 32 when said swivel plate is swiveled upon the pivot shaft 38 by said ring pin 32.

The triangular swivel plate 34 is pivotally suspended, as hereinafter described in detail, from a pivot plate 36 (Figures 9 and 16) which is supported by any appropriate means, such as the pivot plate posts 37, so that said swivel plate may oscillate above the connecting ring 30 and the selector bar 18. The ring pin 32 removably enters, but does not extend through, the swivel plate slot 33 from the bottom of said plate. The pivot shaft 38 is secured to the top of said swivel plate 34, adjacent to that edge thereof which is substantially parallel to the swivel plate slot 33, by any suitable means such as the pivot shaft end disk 39 which disk is preferably integral with said swivel plate 34.

Said pivot shaft 38, which is preferably centered over the swivel plate slot 33, midway between the extremities thereof, extends vertically upward from swivel plate 34 through the center of a bearing 40 whose outer race is securely held by means of a press fit within a suitable recess in the underside of the pivot plate 36 (Figures 16 and 17). The upper end of said pivot shaft 38, which extends through said pivot plate 36, is engaged by a swivel plate support collar 41. A shoulder 41a, integral with the lower side of said collar 41, retains the inner race 40a of the said bearing 40 against the shoulder 38a of the shaft 38.

Thus, the swivel plate 34 is supported on the pivot plate 36 by means of the pivot shaft end disc 39, the pivot shaft 38, the swivel plate support collar 41 and the bearing 40 in that order. However, it will be understood that the specific means described above for supporting said swivel plate is intended to disclose one particular preferred method for illustrative purposes only.

It will be observed that said connecting ring 30, said triangular swivel plate 34, said pivot plate 36, and said pivot shaft 38 combine their individual functions in a manner hereinafter described in detail to translate the motion of said connecting block into the motion of said selector bar.

That end of said connecting block 29 remote from the selector bar is provided with a horizontal block pin 42 (Figures 5 and 6) which is engaged by the lower end of a tripping lever 43, the upper end of which lever is pivotally secured to the upper extremity of a tripping bar 44. A cam following pin 45, intermediate the said upper and lower ends of said tripping lever 43, extends outwardly from said lever 43 on the side opposite to that side adjacent said tripping bar 44. Said cam following pin 45 is slidably held beneath the cam track 51 on the cam track support 46, which is mounted by any conventional means, such as bolts, upon said base plate 16 parallel to said elongated guide recess 28.

The cam track 51 follows the arc of a circle whose center lies on the centerline of that portion of the bearing 54 upon which said tripping bar 44 is rotatably supported. The arcuate cam track 51 is relieved at the end thereof nearest to the selector bar 18 by a straight edge 51a which extends from a point on said arcuate cam track upwardly to the edge of the cam track support 46. In this embodiment of the invention, the straight edge 51a is disposed at any angle of approximately 30° to the tangent of the arcuate edge 51 at the point where the two edges join.

This tripping bar 44 extends up through a narrow tripping bar slot 47 (Figure 8) in said base plate 16, which slot is parallel to and positioned between said elongated guide recess 28 and said cam track support 46. The tripping bar pin 48 (Figures 5, 6 and 9) by means of which said tripping lever 43 is pivotally secured to said tripping bar 44, extends through and beyond said tripping bar to be engaged by one end of a suitable resilient means, such as a recoil spring 49, whose other end is held by a spring post 50 mounted at the rightward end of said base plate 16 as viewed in Figures 9, 10, and 11.

Figure 12:
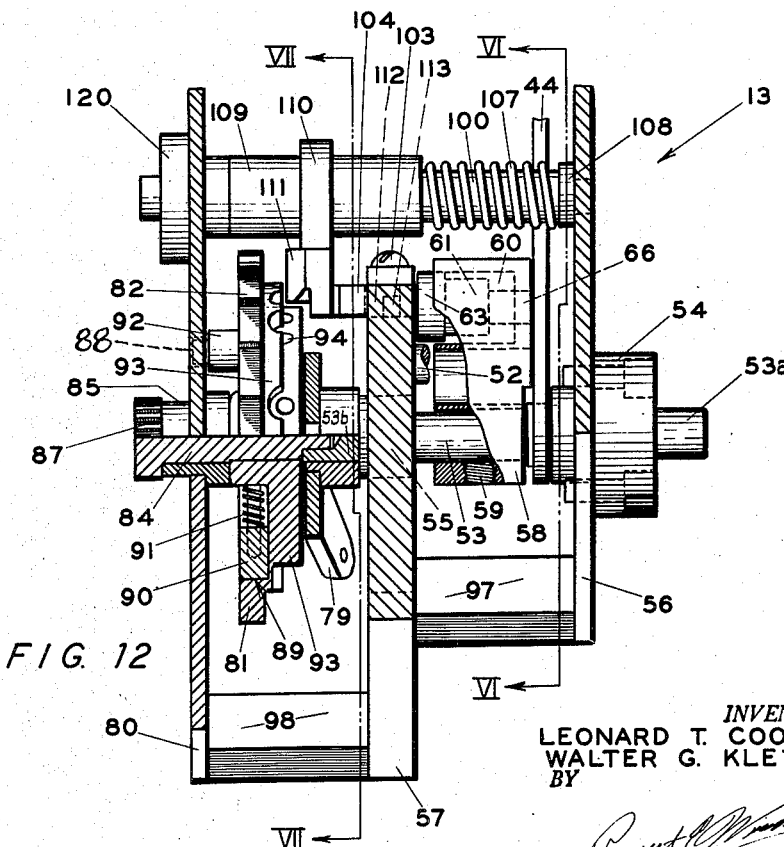
Figure 12 is a cross-sectional view of the counting unit taken along the line XII—XII of Figures 4 and 6 except for the sectioned portion of the view between the mid-wall and the rear-wall and below the centerline of the shaft supporting the ratchet arm and ratchet wheel, which section is taken along the line XIIA—XIIA of Figure 7.

It may be observed in Figures 12 and 13 that a rockshaft 53 is rotatably supported by suitable bearings 54 and 55 within the front wall 56 and mid-wall 57 respectively, of said lower chamber 13 which supports and houses the said counting and tripping mechanisms. Said rockshaft 53 has an outer end 53a and inner end 53b which extend beyond the bearings 54 and 55, respectively, as hereinafter described in detail. The lower extremity of the tripping bar 44 is rotatably sleeved upon a portion of said bearing 54 which extends within the chamber 13 from the said front wall. Thus, said tripping bar is rotatably mounted substantially adjacent to the inside of said front wall. The counting or accumulating mechanism effects the actuation of the tripping bar 44 which is a part of the tripping mechanism now to be described.

*The tripping mechanism*

The tripping mechanism in general comprises a ratchet and pawl means and a plunger arm 58, both of which are mounted upon a rockshaft 53 which is rotationally responsive to the movement of a crank 75. When said crank, hence said ratchet and pawl, has been actuated a predetermined number of times, the counting mechanism, hereinafter described in detail, causes a plunger in said plunger bar 58 to engage the tripping bar 44. The next actuation of said crank will pivot said tripping bar 44 and thereby actuate the selector bar 18 through the selection mechanism.

The plunger arm 58 (Figures 12 and 13) is secured to said rockshaft 53 between said tripping bar 44 and said mid-wall 57 by means including a set screw 59, and extends radially upwardly from said rockshaft in approximately the same direction as said tripping bar 44. A plunger arm stop 52 is affixed to, and extends out from, that side of said mid-wall 57 adjacent to said plunger arm for the purpose of engaging said plunger arm and preventing it, hence said rockshaft, from rotating excessively in a counter clockwise direction, as appearing in Figures 4, 5 and 6, for reasons to be disclosed hereinafter.

The end of said plunger arm which is remote from said rockshaft 53, is provided with a cylindrical plunger cavity 60 (Figure 13), which slidably receives a reciprocable plunger 61, comprising (Figure 14) a body part 61a, a plunger head 63 and a plunger pin 66. The head 63 is necessarily of sufficient diameter that it will be in line for engagement by the hereinafter mentioned trigger pin 104 in any position of the plunger arm 58. A suitable resilient means, such as the coiled plunger spring 62, urges said plunger 61 out of said cavity 60 and against said mid-wall 57, said spring being under compression between the bottom of said cavity and the plunger head 63.

A cylindrical chamber 64 within said plunger body part 61a slidably retains the head 65 of the plunger pin 66, which is urged toward its extended position with respect to said plunger 61 by such resilient means as the plunger pin spring 67 which is held under compression against one end of the said chamber 64, suitably retained by a guide pin, and a suitable recess in the opposing side of said head 65.

The mid-wall 57 prevents the plunger spring 62 from ejecting the plunger 61 out of the cavity 60 in the plunger arm 58. The annular lip 68, integral with the walls defining the chamber 64, limits the rightward travel as viewed in Figure 14 of the plunger pin head 65. When the plunger 61 is depressed into the cavity 60, the plunger pin 66 protrudes through the plunger pin opening 69, which penetrates that sidewall of said plunger arm 58 adjacent to the tripping bar 44. However, whenever the plunger arm 58 is in such a position that said plunger pin opening 69 is obstructed by the tripping bar 44 when said plunger 61 is depressed rightwardly, as aforesaid, the plunger pin 66 will be depressed into the chamber 64, thereby compressing the plunger pin spring 67. As soon as the plunger arm 58 is rotationally moved counterclockwise, as appearing in Figure 6, out of line with said tripping bar 44, the plunger pin spring 67 will eject said pin 66 until the plunger pin head 65 bears against the annular lip 68. A clockwise actuation (Figure 6) of said plunger arm by said rockshaft 53 will cause said pin 66 to engage the edge of the tripping bar 44 (Figure 13), thereby effecting an operation of the selection mechanism and selector bar in the upper chamber 11.

As appearing in Figures 12 and 14, the plunger 61 extends leftwardly and bears against the midwall 57, and the plunger pin 66 is in its normal retracted position, within the plunger arm 58. As shown in Figure 13, the plunger 61 has been depressed rightwardly by the trigger bar 104, hereinafter described in detail, into the plunger cavity 60 against the spring 67 so that the plunger pin 66 projects out of the plunger arm 58 for the purpose of engaging and actuating the tripping bar 44, as aforesaid.

A crank 75, having a cam roller 76 on one end thereof, Figure 4, is secured at its other end to the outer end 53a of said rockshaft 53 which extends beyond the bearing 54, outside of said lower chamber 13. As illustrated in Figures 4, 5 and 11, said cam roller is positioned for cooperation with a cam 77 which may be carried on the revolving head 78 of any conventional tablet making machine or otherwise associated with a conveyor for actuation therewith. Although said head 78 may be equipped with as many cams as desired or required, it will be assumed, for illustrative purposes only, that in this particular embodiment of the invention there will be but one cam attached to said revolving head 78. Hence, said crank 75 will be actuated once by said cam with each revolution of said revolving head. A ratchet arm 79 (Figures 7, 12 and 13) is secured to and movable with the inner end 53b of said rockshaft 53 which extends beyond the mid-wall 57 on the opposite side thereof from said plunger arm 58. Thus, said ratchet arm lies between, and oscillates within a plane substantially parallel to, said mid-wall 57 and the rear wall 80.

A ratchet wheel 81, which lies between said ratchet arm 79 and said rear wall 80 and whose ratchet teeth 82 are engaged by a ratchet pawl 83, associated with one extended end of said ratchet arm as appearing in Figure 7, is attached to and rotatable with a stub shaft 84, which shaft is co-axial with said rockshaft 53 and mounted as hereinafter described. Said ratchet pawl 83 may be of any convenient conventional, spring loaded type which will produce the desired rotational movement of said ratchet wheel 81.

The extended end of said ratchet arm 79, remote from said pawl 83, is engaged by resilient means, such as the ratchet arm spring 86, which may be secured to a rear wall support post 98, Said spring 86 recocks the ratchet arm 79 after each actuation of said ratchet arm and the resultant actuation of said ratchet wheel 81 by said crank. The recocked position of said ratchet arm is controlled by the engagement of said plunger arm 58, which is also secured to said rockshaft as aforesaid, with the plunger arm stop 52.

Said stub shaft is rotatably supported on one side of said ratchet wheel by a suitable bearing 85 in the rear wall 80. The other end of said stub shaft is provided with a pilot for rotatable support within an appropriate recess in the inner end 53b of said rockshaft. A ratchet wheel gear 87 is attached to, and rotatable with, a portion of said stub shaft 84 which extends beyond said bearing 85 on the outside of said lower chamber 13.

That side of said ratchet wheel adjacent to said rear wall 80 is preferably, but not necessarily, provided with an annular recess 89, concentric with said ratchet wheel, in which a suitable braking device is housed. Such braking device may, for example, be comprised of a pair of semicircular brake shoes 90 held snugly against diametrically opposed portions of the inner wall of said annular recess 89 by suitable resilient means, such as a pair of suitably guided coiled brake springs 91, which are held under compression between the opposed surfaces of said brake shoes. Said brake shoes are flexibly supported by means such as the brake shoe pins 92 which are rigidly secured to the brake shoes 90 in any suitable manner and are received with substantial wear clearance into pin openings 88 in the rear wall 80.

The counting mechanism

That side of said ratchet wheel opposite said recess has an integral, co-axial cam wheel 93 whose diameter is perferably smaller than that of said ratchet wheel. Said cam wheel is provided with a plurality of cam screw openings 94, whose axes are radially disposed with respect to said cam wheel, and which are designed to receive cylindrically headed cam screws 95, as illustrated in Figure 13.

Said rear wall 80 and said front wall 56, are rigidly secured to opposite ends of the support post 96 (Figure 7) and may be fabricated from a suitable sheet material, such as aluminum or steel. The mid-wall 57, may be rigidly secured to said front wall by means of a plurality of front wall posts 97 (Figure 13) and to said rear wall by means of a plurality of rear wall posts 98 and is preferably, but not necessarily, made from steel plate, relatively thicker than the material used in said front and rear walls.

The upper edge 57a (Figure 6) of said mid-wall 57 is diagonal with respect to the vertical edges thereof to avoid interference with the vane shaft 100 and to provide easy access to the trigger bar 104 (Figures 6, 12, 13) which is reciprocably associated with a suitable trigger bar slot 105 in the said diagonal upper edge of said mid-wall. The trigger bar is slidably retained within the trigger bar slot 105 by means of a trigger bar retainer 106 which is secured to said diagonal edge 57a across the said slot 105 by means of the retainer screws 103. The opening in said mid-wall 57 created by the slot 105 and the retainer 106 is so positioned along the said diagonal edge 57a that an appreciable part of said opening will always be covered by the plunger head 63 as long as said plunger arm remains within the limits of its normal operating range, by which to insure contact between the said plunger head 63 and said trigger bar 104 in any position of the plunger arm.

The vane shaft 100 is rotatably supported by suitable bearing means within the rear wall 80 and the front wall 56. A coiled vane spring 107 encircles a portion of said vane shaft, and is held under compression between a collar 108, integral with said vane shaft at the end adjacent to said front wall 56, and the opposing extremity of a vane sleeve 109. Said vane sleeve, is free to slide longitudinally on said vane shaft but is caused to rotate therewith by means such as a loose fitting key and keyway 114 (Figure 7). A vane 110, having a vane cam 111 associated with one end is secured at its other end to said vane sleeve so that a rotation of said sleeve will cause said vane cam 111 to pass between said trigger bar 104 and said cam wheel 93.

Whenever said vane cam 111 is engaged by a cam screw 95 on the periphery of said cam wheel 93, said vane 110, hence said vane sleeve 109 to which it is secured, is moved towards said mid-wall 57. Such movement of said vane effects an equivalent movement of said trigger bar 104 and consequent depression of the plunger 61 within the cavity 60 in said plunger arm 58. As soon as said cam screw moves out of contact with said vane cam, the vane spring 107 urges said vane sleeve and vane back to their former positions, and the plunger spring 62 urges said plunger and trigger bar back to their former positions.

The trigger bar 104 may have a limit opening 112 (Figure 12) for reception of a limit pin 113, secured to said mid-wall 57, for the purpose of preventing said trigger bar from obstructing the path of the rotating vane and vane cam. Said base plate 16 is relieved with a vane opening 115 (Figure 8), therein, to prevent its interference with the rotation of said vane 110.

Figure 15:
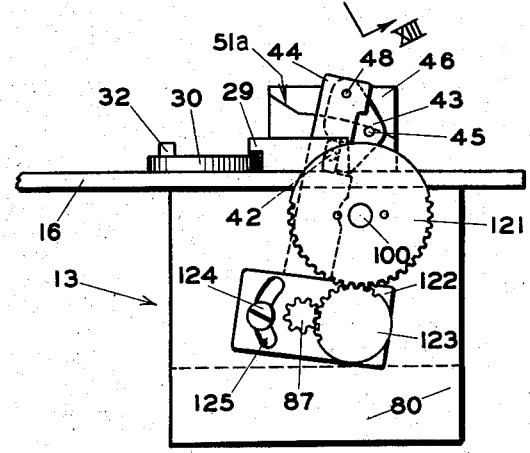
Figure 15 is a side elevation view of the said counting unit from the opposite side thereof from that shown in Figures 4 and 6.

A vane gear collar 120, which is sleeved upon, and suitably secured to, that end of said vane shaft 100 extending beyond said rear wall 80, may be fastened to the rear wall by any means such as bolting and thereby hold the vane shaft, hence said vane, against rotation. When it becomes desirable to rotate said vane shaft 100, hence the vane 110, the vane gear collar is disengaged from said rear wall 80 and secured to a vane gear 121 with which it is necessarily co-axial. An idle gear block 122, one end of which rotatably supports an idle gear 123, (Figures 13 and 15) is pivotally sleeved about midway between its extremities onto that portion of the bearing 85 which extends outside of the rear wall 80, as appearing in Figures 12, 13 and 15. Said idle gear 123, which is in continuous engagement with the ratchet wheel gear 87, may be adjustably held in engagement with said vane gear 121 by means, such as an idle block adjusting screw 124 (Figure 15), which threads into the rear wall 80 through an appropriate, semicircular slot 125 near that end of the idle gear block 122 remote from said idle gear. Thus, any rotational movement of the ratchet wheel 81 will be translated into a rotational movement of the vane 110 through the ratchet wheel gear 87, idle gear 123, vane gear 121, vane shaft 100 and vane sleeve 109.

It will be understood that the above disclosed geared means is described in detail for illustrative purposes only, and is not intended to limit the scope of the invention. The said gears may be of any convenient, conventional type and/or size and the number of gears in the resultant gear train may be increased as desired or required to obtain the proper rotational speed of the vane 110 in relation to the rotational speed of the ratchet wheel 81.

A pawl block 126 (Figure 7), which may be secured to the rear wall 80, supports a spring loaded, back lash pawl 127, which limits the ratchet wheel 81 to a unidirectional rotation by engaging the ratchet wheel teeth 82.

*The discharge gate and chute*

As illustrated in Figures 1, 3, 9, and 11, a finger support 128 is attached to, as by bolting, and depends from that end of the selector bar 18 which extends from the same side of the counting unit 10 as the crank 75 and cam roller 76. A flexible selecting finger 129, which may, for example, be made from a flat, thin metallic strip, is horizontally secured to the lower end of said finger support 128. When in operation, said counting unit 10 is so positioned that the lower longitudinal edge of the outer portion of said selecting finger 129 sweeps the upper surface of the outer periphery of the revolving head 78 of the tablet making machine upon which the tablets are being conveyed.

Said selecting finger 129 is advantageously fabricated from the weakest material permissible in order to minimize the likelihood of damaging either the counting unit or the tablet machine in the event that said finger should become fouled upon a part of the revolving head. A finger brace 130, also anchored on the finger support 128, may be used to stiffen said finger.

The portion of the finger 129 which extends inwardly from its finger support, hence beneath the base plate 16 of said counting unit, may be shaped to the contour of the central guide member 134 of a suitable, combination selector chute and dust collecting unit 135. Thus, when said selecting finger is extended into the path of the tablets 136 on the head 78, a smooth, unbroken wall is provided by means of which said tablets will be guided down the left hand chute 137 as appearing in Figure 1, into any suitable container, not shown. The right guide wall 139 of the right hand chute 138 may be provided with a stationary guide finger 140 which intercepts and guides into said right hand chute the tablets 136 when the selecting finger 129 is withdrawn from the path of the tablets.

For this particular embodiment of the invention the side-walls of said left hand chute 137 and said right hand chute 138, as illustrated in Figure 2, are provided with a plurality of small openings 141 through which an appropriate fluid, such as air, is forced under pressure. Said air, which may be supplied through the air tubes 142 from any convenient source not shown, tends to free any loose particles clinging to, or entrained by, said tablets as they pass down said chutes. The loosened particles and the air emitted from said openings 141 are exhausted through the perforated bed plates 143 in the bottom of each chute, and into the exhaust header 144 by means of a suitable exhaust system, not shown.

During the process of manufacture, the said tablets pick up a static charge which attracts and holds to the tablet a considerable amount of the loose dust particles in spite of the air stream being constantly circulated within the chutes. The said charge would normally dissipate shortly after the tablets reach the bottles or containers at the base of the chute thereby freeing the dust particles which would then cloud up the bottom and sides of the bottles. However, a member including a radio active element, such as polonium, is placed on the chute cover plate 145 adjacent to the chutes 137 and 138, which element emits sufficient alpha radiation to ionize the zone surrounding said chutes and thereby neutralize the static charge upon said tablets, thus freeing the dust immediately and enabling it to be drawn off by the air stream before the tablet goes into the bottle.

*Operation*

The discharge control and counting unit 10, to which this invention relates, must be fixed with respect to the means rotatably supporting said revolving head for proper operation. The lower chamber 13 and crank 75 must be positioned so that the cam roller 76 will be engaged and depressed by the cam 77 during each rotation of the revolving head 78 to which said cam 77 is attached. The selecting finger 129 is adjusted vertically with respect to the selector bar 18, to which it is attached, so that when said selector bar is extended, said selecting finger sweeps the top of the revolving head 78 in the path of articles, such as tablets, conveyed on said head.

An appropriate number of cam screws 95 are placed into the openings 94 along the periphery of the cam wheel 93, in order to effect a desired and predetermined actuation of the selecting mechanism as hereinafter described. If broader control of the counting and selecting mechanisms is required, such control may be obtained to an unlimited extent by rotating the said vane 110, through the vane gear 121, the ratchet wheel gear 87 and any number and/or variety of additional, intermediate gears.

Thus, by means of selected variations in the arrangement of intermediate gears and placement of cam screws, the crank 75 may be actuated any number of times desired before the rotating vane cam 111 comes between a cam screw 95 and the trigger bar 104 to effect actuation of the selection mechanism in the upper chamber 11, thereby securing an unlimited counting range for the device.

For purposes of illustration and in order to disclose fully the complete operation of said counting unit, it will be assumed that the vane 110 is geared for rotation, that the cam wheel 93 has but one cam screw 95 attached to its periphery and that there is but one cam 77 attached to said revolving head 78 of the tablet making machine.

With each revolution of the revolving head 78, the cam 77 engages and depresses the cam roller 76, thereby causing the crank 75, and the rockshaft 53 to which it is secured, to rotate in a clockwise direction as appearing from the front wall side of the counting unit (Figure 4). The plunger arm 58 (Figure 12) and ratchet arm 79, which are secured to said rockshaft, will rotate therewith. As the plunger arm 58 moves arcuately around the rockshaft, the plunger cap 63 slides along said mid-wall 57 over the opening therein provided by the trigger bar slot 105. The spring loaded ratchet pawl 83 (Figure 7), associated with one end of said ratchet arm 79, engages the teeth 82 of said ratchet wheel 81 and rotationally moves said ratchet wheel a selected distance with each actuation of said crank 75. At the end of each crank driven movement, the ratchet arm spring 86, which is held under tension between the frame of the counting unit and that end of said ratchet arm remote from said ratchet pawl 83, rotates said ratchet arm 79, the crank 75 and other associated parts back into their original positions, until said plunger arm 58 rests against said plunger arm stop 52. The back lash pawl 127 prevents said ratchet wheel from returning to its previous position as said ratchet pawl 83 drags across said ratchet teeth 82 when said ratchet arm 79 is recocked as aforesaid.

The brake shoes 90 (Figure 12) within the annular recess 89 of said ratchet wheel 81 drag sufficiently to prevent said ratchet wheel from rotating beyond the point to which it is actually urged by said ratchet arm 79 and ratchet pawl 83 when said crank 75 is actuated by said cam 77. Thus it is made certain that the counting will be accurate.

The rotational movement of said ratchet wheel 81 produces a corresponding movement in said vane 110 through said stub shaft 84, the gears 87, 123 and 121, the vane shaft 100, and vane sleeve 109 to which said vane is secured, as aforesaid. It will be understood that until such time as said vane cam 111 is engaged by the head of said cam screw 95 mounted upon said cam wheel 93, all movements within said counting unit are confined to the lower chamber 13, below the base plate 16. Such movements will be substantially a repetition of those described above, each time the cam roller 76 is depressed by said cam 77.

When, as determined by the particular arrangement of the gear train mounted on the outside of the rear wall 80, said vane cam 111, arriving in line with the trigger bar 104, engages said cam screw 95, said vane 110 and said vane sleeve 109 are moved along the vane shaft 100 towards the front wall 56 of the lower chamber 13, thereby compressing the vane spring 107 between the vane shaft collar 108 and the opposed edge of the vane sleeve 109. That side of the free end of the vane 110 adjacent to the mid-wall 57 urges said trigger bar 104 rightwardly through the trigger bar slot 105, as illustrated in Figure 13, thereby causing said trigger bar to depress the plunger 61 into the plunger cavity 60. The depression of the plunger 61 will urge a protrusion of the plunger pin 66 through the plunger pin opening 69 which protrusion will occur as long as the plunger arm 58 is clear of the tripping bar 44. The next actuation of said crank 75 by said cam 77 and the corresponding pivotal motion of said plunger arm 58 will cause said extended plunger pin 66 to engage the adjacent edge of said tripping bar 44, thereby effecting the movements within said upper chamber 11 hereinafter described in detail.

Such next actuation of the crank 75 by said cam 77 will, immediately following the movement of the tripping bar 44, effect a disengagement of the vane cam 111 and the cam screw 95, whereupon the vane sleeve 109 and the attached vane 110 will be urged towards the rear wall 80, back into their original normal positions, by the compressed vane spring 107. The plunger spring 62, indirectly held in compression by said vane 110, will eject the plunger 61 leftwardly from the plunger cavity 60, until the plunger cap 63 again bears against the mid-wall 57, and thereby will urge the trigger bar 104 back through the trigger bar slot 105, as and when the vane 110 recedes to its normal plane of rotation, where it remains until again engaged by the cam screw 95. As the plunger 61 is thus released from the cavity 60 the plunger pin 66 is simultaneously retracted into the plunger arm 58. The tripping bar 44 will, therefore, remain motionless during subsequent actuations of the crank 75 and the plunger arm 58, until the plunger pin 66 is again caused to extend from said plunger arm by another movement of the vane along its supporting shaft 100. Consequently, until the next actuation of the trigger bar 104, the selection mechanism will remain unmoved, the selector bar 18 will occupy a constant position, and the tablets will be directed down a single, selected chute.

Referring to Figures 4, 6, 9 and 11, it will be noted that until said tripping bar 44 is engaged and moved as described by the said plunger pin 66, the upper end of said tripping bar is held towards the rightward end of the tripping bar slot 47 (Figure 9) by the recoil spring 49 whereby said tripping bar is held against the horizontal block pin 42 (Figure 4) of the connecting block 29.

The selector bar 18, hence the attached selecting finger 129, may be either extended or retracted, as desired, while said tripping bar 44 remains near the said rightward end of said slot 47 and while said connecting block 29 remains near the rightward end of the elongated guide recess 28, as appearing in Figures 9 and 11. For the purposes of illustration it will be assumed that at the beginning of the cycle, hereinafter described, said selector bar is in the retracted position, as shown in Figure 9, and the ring pin 32 is in the rearward end 27 of the said swivel plate slot 33.

When the upper end of said tripping bar 44 is moved leftwardly as aforesaid and as appearing in Figures 9 and 10, or rightwardly as appearing in Figures 4, 5 and 6, the tripping lever 43, pivotally secured to said upper extremity of said tripping bar, engages said horizontal block pin 42, thereby moving said connecting block 29 toward the selector bar. The cam following pin 45, secured to said tripping lever 43, follows and is held down by the cam track 51 on the cam track support 46 so that said tripping lever 43 is not permitted to rotate clockwise around its pin 48 when said lever engages said horizontal block pin 42. Thus a movement of the top of the tripping bar toward the selector bar 18 similarly moves the connecting block 29 by means of the horizontal block pin 42. The connecting ring 30, which is pivotally attached to said connecting block 29, is also moved toward the selector bar, thereby effecting a clockwise rotation as appearing in Figures 9 and 10 of the triangular swivel plate 34 about the pivot pin 38. Since said swivel plate 34 is also pivotally attached to the selector bar 18 by means of the swivel plate pin 35 being received into the elongated opening 23 in said selector bar, said clockwise rotation of said swivel plate 34 effects an extension of the selector bar 18.

In order to prevent an injury to the selection mechanism due to an excessive actuation of the tripping mechanism the cam track 51 is relieved upwardly at 51a (Figures 4, 5 and 6) so that the cam following pin 45, which is attached to the tripping lever 43, may rise and thereby permit a clockwise rotation, as appearing in Figures 4 and 6, of the said tripping lever. Such clockwise rotation of said tripping lever 43 permits the lower extremity thereof to slide up over the horizontal block pin 42 and thus leave the connecting block 29 when said tripping lever is urged towards the selector bar by the tripping bar beyond a predetermined point. The relieved portion 51a in the cam track 51 is so positioned that the above operation and release will occur when the tripping bar reaches said predetermined point where all motion needed for actuation of the gate has been provided, but beyond which injury must begin.

An overrun of the tripping bar 44 may stem from a variety of couses, such as the impossibility of obtaining and maintaining exact adjustment of all the operating parts or a maladjustment in the level of the counting unit with respect to the revolving head 78 of the conveyor whereby the cam 77 secured to said revolving head would over-actuate the crank 75 and hence, through the intermediate mechanism, over actuate the tripping bar 44.

When the tripping bar 44 is no longer urged leftwardly as aforesaid, the recoil spring 49 draws said tripping bar in a rightwardly direction as appearing in Figures 10 and 11. The connecting block 29 and connecting ring 30 are thus moved rightwardly away from the selector bar by the tripping bar 44 when it engages said horizontal block pin as it returns rightwardly. The ring pin 32 thus slides along the slot 33 from its rearward end 27 to its front end 26, whereby said selector bar is positively held in the extended position and the selection mechanism is automatically re-cocked for reactuation by said tripping mechanism.

With the next leftwardly actuation of said tripping bar 44, the swivel plate is rotated in a counterclockwise direction about the pivot pin 38 by means of the connecting ring 30, connecting block 29 and tripping lever 43, as aforesaid, thereby causing said selector bar 18 to retract. Release of the pressure urging said tripping bar leftwardly recocks the selecting mechanism in the same manner as aforesaid and completes the cycle of extending and retracting said selector arm. Such cycles may be repeated indefinitely.

As illustrated in Figures 1, 2, 3 and 11, the extended selector bar 18 will cause the attached selecting finger 129 to intercept the path of the tablets 136, being conveyed upon said revolving head 78, and direct them down the left hand chute 137 of a selector chute and dust collecting unit 135 into any convenient conventional container, not shown. A retraction of said selector bar 18 withdraws said selecting finger 129 from the path of said tablets 136 so that they may be intercepted by the stationary guide finger 140 and thereby directed down the right hand chute 138 of said selector chute and dust collecting unit 135 into said containers. Any particles adhering loosely to said tablets may be freed by neutralizing the static charge upon said tablets, as aforesaid, and carried off by air, or other gas, emitted through said openings 141 and exhausted through said perforated bed plates 143, as aforesaid.

Accordingly, we have illustrated and described a device capable of meeting the objects and purposes above outlined.

While we have shown in detail a specific embodiment of our invention, it is to be understood that such is solely for illustrative purposes. It is not our invention, implied or otherwise, to eliminate other variations or modifications which do not depart from the scope of our invention unless specifically stated to the contrary in the hereinafter appended claims.

We claim:

1. In a tablet making machine having a conveyor member carrying finished tablets, a pair of chutes receiving the tablets from said conveyor member, and a gate alternately extendable across the path of said tablets on said conveyor member for guiding them into one chute and retractable from such position to permit said tablets to go into said other chute, means for effecting the extension and retraction of said gate comprising: a frame comprising a pair of end plates, a mid-plate between said end plates and a selector base plate affixed perpendicularly to said end plates; a rockshaft rotatably mounted on one end plate and said mid-plate and having a crank thereon adjacent to but outwardly from said end plate and a conveyor cam on said conveyor member cooperating with said crank for moving it in one direction upon predetermined movement of said conveyor member; a tripping bar rotatably supported upon said rockshaft for rotatable movement with respect thereto and extending through the selector base plate to a point thereabove; a plunger arm affixed to said rockshaft for rotatable movement therewith and closely adjacent to said tripping bar, said plunger arm having a retractable pin extending therefrom in a direction parallel to the axis of said rockshaft; a pawl mounted upon an arm affixed to said rockshaft for movement therewith and resilient means urging movement of said arm and pawl in a direction opposite to that in which they are moved upon actuation of the crank by said conveyor cam; a ratchet rotatably mounted upon the other end plate for cooperation with said pawl, having an axially extending flange thereon and a removable cam carried on the peripheral surface of said flange; a vane shaft parallel with said rockshaft, positively driven from said rockshaft and rotatably carrying an axially slidable, radially extending vane, said vane having a vane cam near its free end, said parts being so arranged that one point in the path of revolution of the removable cam carried by the ratchet flange will coincide with a point in the path of revolution of said vane cam, whereby said ratchet flange cam will move said vane axially at predetermined intervals; means actuated by such axial movement of said vane urging said retractable pin in the plunger arm into operable engagement with said tripping bar; means located on said selector base plate operably connecting the free end of said tripping bar with said gate in such a manner that uni-directional movement of said tripping bar will shift said gate from either position into its other position.

2. In a tablet making machine having a conveyor member carrying finished tablets, a pair of chutes receiving the tablets from said rotating member, and a gate alternately extendable across the path of said tablets on said conveyor member for guiding them into one chute and retractable from such position to permit said tablets to go into said other chute, means for effecting the extension and retraction of said gate comprising: a frame comprising a pair of end plates, a mid-plate between said end plates and a selector base plate affixed perpendicularly to said end plates; a rockshaft rotatably mounted on one end plate and said mid-plate and having a crank thereon adjacent to but outwardly from said end plate and a conveyor cam on said conveyor member cooperating with said crank for moving it in one direction upon predetermined movement of said conveyor member; a tripping bar rotatably supported upon said rockshaft for rotatable movement with respect thereto and extending through the selector base plate to a point thereabove; a plunger arm affixed to said rockshaft for rotatable movement therewith and closely adjacent to said tripping bar, said plunger arm having a retractable pin extending therefrom in a direction parallel to the axis of said rockshaft; a pawl mounted upon an arm affixed to said rockshaft for movement therewith and resilient means urging movement of said arm and pawl in a direction opposite to that in which they are moved upon actuation of the crank by said conveyor cam; a ratchet rotatably mounted upon the other end plate for cooperation with said pawl, having an axially extending flange thereon and a removable cam carried on the peripheral surface of said flange; a vane shaft parallel to said rockshaft, positively driven from said rockshaft and rotatably carrying an axially slidable, radially extending vane, said vane having a cam near its free end, said parts being so arranged that one point in the path of revolution of said vane cam is adjacent to one point in the path of revolution of the removable cam carried by the ratchet flange whereby said ratchet flange cam will move said vane axially at predetermined intervals; means actuated by such axial movement of said vane urging said retractable pin in the plunger arm into operable engagement with said tripping bar; a tripping lever pivotally affixed to the free end of said tripping bar and extending towards the selector base plate at an acute angle to the tripping bar; a cam holding said tripping lever substantially in said position during a predetermined portion of the arc of movement of the free end of said tripping bar and releasing it from such position at the end of such portion whereby overrunning of the free end of said tripping bar past a predetermined arcuate position is permitted; a slide member having a pin extending into the path of such movement of said tripping lever for engagement thereby when in said position and releasable therefrom when out of such position; and means operable by said slide member actuating said gate.

3. In a machine for discharging conveyor-borne material from said conveyor selectively into one of a plurality of chutes and automatically shifting such discharge from one chute to another in response to movement of said conveyor, the combination comprising: actuating means on said conveyor; independently supported rotatable rockshaft means actuated thereby at predetermined intervals; a rotatable cam carrying member rotated by said rockshaft; a rotatable cam carrying vane mounted for reciprocation along its axis of rotation and rotated in timed relation to the rotation of said cam carrying member; said parts being so arranged that said cams will cooperatively contact each other at a single point common to their respective paths of revolution thereby effecting axial movement of said vane; means responsive to such axial movement effecting shifting of conveyor discharge from one chute to another chute.

4. In a machine for discharging conveyor-borne material from said conveyor selectively into one of a plurality of chutes and automatically shifting such discharge from one chute to another in response to movement of said conveyor, the combination comprising: means rotating a cam in response to movement of said conveyor; means rotating a vane in response to movement of said conveyor, said vane being axially movable upon contact with said cam, and said vane and said cam being so arranged that one point in the revolution of each will coincide with that of the other for effecting such contact; a horizontally slidable member and means responsive to said axial movement of said vane effecting reciprocating movement of said slidable member; means responsive to each reciprocation of said slidable member effecting shifting of said discharge from one chute to another chute.

5. In a machine for discharging a conveyor-borne material from said conveyor selectively into one of a plurality of chutes and automatically shifting such discharge from one chute to another in response to movement of said conveyor, the combination comprising: means rotating a cam in response to movement of said conveyor; means rotating a vane in response to movement of said conveyor, said vane being axially movable upon contact with said cam, and said vane and said cam being so arranged that one point in the revolution of each will coincide with that of the other for effecting such contact; an arcuately movable tripping bar and means responsive to said axial movement of said vane effecting arcuately reciprocating movement of said tripping bar; a tripping lever pivotally connected near the free end of said tripping bar and having a guide pin therein; a cam cooperable with said guide pin to hold said tripping lever in substantially a preselected position with respect to a reference line throughout part of the arc of movement of said tripping bar and to release said tripping lever therefrom in another part of said arc of movement; a tripping pin and means supporting said tripping pin for movement along such line of reference, said preselected position of said tripping lever being such as to effect engagement between it and said tripping pin and cause movement of said pin along said line upon movement of said tripping lever, such engagement being released when said tripping lever is out of such preselected position; means responsive to the movement of said tripping pin effecting shifting of said discharge from one chute to another chute.

6. In a tablet making machine having a conveyor member carrying finished tablets, a pair of chutes receiving the tablets from said conveyor member, and a gate alternately extendable across the path of said tablets on said conveyor member for guiding them into one chute and retractable from such position to permit said tablets to go into said other chute, means for effecting the extension and retraction of said gate comprising: a frame comprising a pair of end plates, a mid-plate between said end plates and a selector base plate affixed perpendicularly to said end plates; a rockshaft rotatably mounted on one end plate and said mid-plate and having a crank thereon adjacent to but outwardly from said end plate and a conveyor cam on said conveyor member cooperating upon said crank for moving it in one direction upon predetermined movement of said conveyor member; a tripping bar rotatably supported upon said frame for rotatable movement with respect thereto and extending through the selector base plate to a point thereabove; a plunger arm affixed to said rockshaft for rotatable movement therewith and closely adjacent to said tripping bar, said plunger arm having a retractable pin extending therefrom in a direction parallel to the axis of said rockshaft; a pawl mounted upon an arm affixed to said rockshaft for movement therewith and resilient means urging movement of said arm and pawl in a direction opposite to that in which they are moved upon actuation of the crank by said conveyor cam; a ratchet rotatably mounted upon the other end plate for cooperation with said pawl, having an axially extending flange thereon and a removable cam carried on the peripheral surface of said flange; a vane shaft parallel to said rockshaft, positively driven from said rockshaft and rotatably carrying an axially slidable, radially extending vane, said vane having a cam near its free end, said parts being so arranged that one point in the path of revolution of said vane cam is adjacent to one point in the path of revolution of the removable cam carried by the ratchet flange, whereby said ratchet flange cam will move said vane axially at predetermined intervals; means actuated by such axial movement of said vane urging said retractable pin in the plunger arm into operable engagement with said tripping bar; a tripping lever pivotally affixed to the free end of said tripping bar and extending towards the selector base plate at an acute angle to the tripping bar; a cam holding said tripping lever substantially in said position during a predetermined portion of the arc of movement of the free end of said stripping bar and releasing it from such position at the end of such portion whereby overrunning of the free end of said tripping bar past a predetermined arcuate position is permitted; a slide member having means cooperable with said tripping lever when in said position and releasable therefrom when out of such position; and means operable by said slide member actuating said gate.

7. In a tablet making machine having a conveyor member carrying finished tablets, a pair of chutes receiving the tablets from said conveyor member, and a gate alternately extendable across the path of said tablets on said conveyor member for guiding them into one chute and retractable from such position to permit said tablets to go into said other chute, means for effecting the extension and retraction of said gate comprising: a frame comprising a pair of end plates, mid-plate between said end plates and selector base plate affixed perpendicularly to said end plates; a rockshaft rotatably mounted on one end plate and said mid-plate and having a crank thereon adjacent to but outwardly from said end plate and a conveyor cam on said conveyor member cooperating with said crank for moving it in one direction upon predetermined movement of said conveyor member; a tripping bar rotatably supported upon said frame for rotatable movement with respect thereto extending through the selector base plate to a point thereabove; a plunger arm affixed to said rockshaft for rotatable movement therewith and closely adjacent to said tripping bar, said plunger arm having a retractable pin extending therefrom in a direction parallel to the axis of said rockshaft; a pawl mounted upon an arm affixed to said rockshaft for movement therewith and resilient means urging movement of said arm and pawl in a direction opposite to that in which they are moved upon actuation of the crank by said conveyor cam; a ratchet rotatably mounted upon the other end plate for cooperation with said pawl, having an axially extending flange thereon and a removable cam carried on the peripheral surface of said flange; a vane shaft parallel to said rockshaft, positively driven from said rockshaft and rotatably carrying an axially slidable, radially extending vane, said vane having a cam near its free end, said parts being so arranged that one point in the path of revolution of said vane cam is adjacent to one point in the path of revolution of the removable cam carried by the ratchet flange, whereby said ratchet flange cam will move said vane axially at predetermined intervals; means actuated by such axial movement of said vane urging said retractable pin in the plunger arm into operable engagement with said tripping bar; a tripping lever pivotally affixed to the free end of said tripping bar and extending towards the selector base plate at an acute angle to the tripping bar; means holding said tripping lever in substantially said position during a predetermined portion of the arc of movement of the free end of said tripping bar and releasing it from such position at the end of such portion whereby overrunning of the free end of said tripping bar past a predetermined arcuate position is permitted; a slide member having a pin extending into the path of such movement of said tripping lever for engagement thereby when in said position and releasable therefrom when out of such position; and means operable by said slide member actuating said gate.

8. In a tablet making machine having a conveyor member carrying finished tablets, a pair of chutes receiving the tablets from said conveyor member, and a gate alternately extendable across the path of said tablets on said conveyor member for guiding them into one chute and retractable from such position to permit said tablets to go into said other chute, means for effecting the extension and retraction of said gate comprising: a frame comprising a pair of end plates, a mid-plate between said end plates and a selector base plate affixed perpendicularly to said end plates; a rockshaft rotatably supported upon bearings mounted within one end plate and said mid-plate and having a crank thereon adjacent to but outwardly from said end plate and a conveyor cam on said conveyor member cooperating with said crank for moving it in one direction upon predetermined movement of said conveyor member; a tripping bar rotatably supported upon the said bearing within said one end plate for rotatable movement with respect thereto and extending through the selector base plate to a point thereabove; a plunger arm affixed to said rockshaft for rotatable movement therewith and closely adjacent to said tripping bar; a pawl mounted upon an arm affixed to said rockshaft for movement therewith and resilient means urging movement of said pawl arm and in a direction opposite to that in which they are moved upon actuation of the crank by said conveyor cam; a ratchet rotatably mounted upon the other end plate for cooperation with said pawl, having an axially extending flange thereon and a removable cam carried on the peripheral surface of said flange; a vane shaft parallel to said rockshaft, positively driven from said rockshaft and rotatably carrying an axially slidable, radially extending vane, said vane having a cam near its free end, said parts being so arranged that one point in the path of revolution of said vane cam is adjacent to one point in the path of revolution of the removable cam carried by the ratchet flange, whereby said ratchet flange cam will contact and move said vane axially at predetermined intervals; means responsive to such axial movement of said vane effecting operable connection between the plunger arm and said tripping bar whereby actuation of the crank will move said tripping bar; means operably connecting the free end of said tripping bar with said gate in such a manner that uni-directional movement of said tripping bar will shift said gate from either position into its other position.

9. In a tablet making machine a conveyor member carrying finished tablets; a pair of chutes receiving the tablets from said conveyor member, and a gate alternately extendable across the path of said tablets on said conveyor member for guiding them into one chute and retractable from such position to permit said tablets to go into said other chute, means for effecting the extension and retraction of said gate comprising: a frame comprising a pair of end plates, a midplate between said end plates, and a selector base plate affixed perpendicularly to said end plates; a rockshaft rotatably mounted on one end plate and said mid-plate and having a crank thereon adjacent to but outwardly from said end plate and a conveyor cam on said conveyor member cooperating with said crank for moving it in one direction upon predetermined movement of said conveyor member; a tripping bar rotatably supported upon said frame for rotatable movement with respect thereto and extending through the selector base plate to a point thereabove; a plunger arm affixed to said rockshaft for rotatable movement therewith and closely adjacent to said tripping bar; rotatable means carrying a cam and means effecting step-by-step rotation thereof in response to actuation of said crank by said conveyor cam; a vane shaft parallel to said rockshaft, positively driven from said rockshaft and rotatably carrying an axially slidable, radially extending vane, said vane having a cam near its free end, said parts being so arranged that one point in the path of revolution of said vane cam is adjacent to one point in the path of revolution of the cam carried by said rotatable means, whereby said vane is moved axially at predetermined intervals; means responsive to such axial movement of said vane effecting operable connection between the plunger arm and said tripping bar whereby actuation of the crank will move said tripping bar; means located on said selector base plate operably connecting the free end of said tripping bar with said gate in such a manner that uni-directional movement of said tripping bar will shift said gate from either position into its other position.

10. In a machine having a gate for automatically and selectively controlling the discharge of a conveyor-borne material from a conveyor into one of a plurality of chutes, and responsive to movement of said conveyor, the combination comprising: a frame and a rockshaft rotatably mounted within said frame and actuating means on said rockshaft; means on said conveyor cooperating with said actuating means on said rockshaft for rotatably oscillating said rockshaft; a bar rotatably supported upon said rockshaft; means coaxial with said rockshaft rotatably supported by said frame and a cam carried thereby, and means secured to said rockshaft effecting step-by-step rotation of said cam carrying means in response to movement of said conveyor; a reciprocable member mounted on said frame and engageable by said cam for movement in a direction parallel with the axis of said rockshaft at predeterminable intervals; means responsive to movement of said member effecting a rotation of said bar; and linkage responsive to movement of said bar effecting an actuation of said gate and thereby shifting the conveyor discharge from one chute to another chute.

11. In a machine for automatically controlling the discharge of a conveyor-borne material from a conveyor responsive to movement of said conveyor, the combination comprising: a frame having a base plate and a rockshaft rotatably mounted upon said frame below said base plate; means on said rockshaft cooperating with said conveyor for rotatably oscillating said rockshaft; a vane rotatably mounted upon said frame below said base plate for movement in a direction substantially parallel with said rockshaft at predeterminable intervals; a cam carrying means rotatably supported within said frame, said cam engaging said vane and effecting such movement thereof; and means responsive to oscillation of the rockshaft for effecting rotation of the cam carrying means; a gate reciprocably mounted upon said base plate for selectively intercepting said material; a reciprocable block slidably supported upon said base plate for movement toward and away from said gate; means responsive to movement of said vane effecting movement of said block; a swivel plate having a slot and pivotally supported above said base plate between said block and said gate for reciprocating said gate; and a link pivotally engaging said block and the walls of said slot for pivoting said swivel plate upon movement of said block, whereby a shift of said gate is effected only upon movement of said block toward said gate.

12. In a machine for automatically controlling the discharge of a conveyor-borne material from a conveyor responsive to movement of said conveyor, the combination comprising: a frame having a base plate and a rockshaft rotatably mounted upon said frame below said base-plate; means on said rockshaft cooperating with said conveyor for rotatably oscillating said rockshaft; a vane having a cam thereon and mounted upon said frame below said base plate for reciprocable movement in a direction substantially parallel with said rockshaft at predeterminable intervals; actuating means rotatably supported within said frame for engaging said cam and effecting such movement of said vane; and means responsive to oscillation of the rockshaft for effecting rotation of the actuating means; a gate reciprocably mounted upon said base plate for selectively intercepting said material; a reciprocable block slidably supported upon said base plate for movement toward and away from said gate; means responsive to movement of said vane effecting movement of said block; a swivel plate having a slot and pivotally supported above said base plate between said block and said gate for reciprocating said gate; and a link pivotally engaging said block and the walls of said slot for pivoting said swivel plate upon movement of said block, whereby a shift of said gate is effected only upon a movement of said block toward said gate.

13. In a machine for automatically controlling the discharge of a conveyor-borne material from a conveyor responsive to movement of said conveyor, the combination comprising: a base plate; a rockshaft rotatably supported below said base plate and means on said rockshaft for rotation thereof in response to the movement of the conveyor; a member rotatable by said rockshaft and a cam carried thereon; a vane mounted below said base plate engageable by said cam for movement in a direction substantially parallel with said rockshaft at predeterminable intervals; a gate reciprocably mounted upon said base plate for selectively intercepting said material; a reciprocable block slidably supported upon said base plate for movement toward and away from said gate; means responsive to movement of said vane effecting movement of said block; a swivel plate having a slot and pivotally supported above said base plate between said block and said gate for reciprocating said gate; and a link pivotally engaging and connecting said block and said slot for pivoting said swivel plate upon movement of said block whereby a shift of said gate is effected only upon a movement of said block toward said gate.

14. In a tablet making machine having a conveyor member carrying finished tablets, a pair of chutes receiving the tablets from said conveyor member, and a gate alternately extendable across the path of said tablets on said conveyor member for guiding them into one chute and retractable from such position to permit said tablets to enter said other chute, means for effecting the extension and retraction of said gate comprising: a frame comprising a pair of end plates, a mid-plate between said end plates and a base plate affixed perpendicularly to said end plates; a rockshaft rotatably mounted on one end plate and said mid-plate and having a crank thereon adjacent to but outwardly from said end plate, and a conveyor cam on said conveyor member cooperating with said crank for moving it in one direction upon predetermined movement of said conveyor member; a tripping bar rotatably supported upon said frame for rotatable movement with respect thereto and extending through the base plate to a point thereabove; a plunger arm affixed to said rockshaft for rotatable movement therewith and closely adjacent to said tripping bar, said plunger arm having a retractable pin extending therefrom in a direction parallel to the axis of said rockshaft; a pawl mounted upon an arm affixed to said rockshaft for movement therewith and resilient means urging movement of said arm and pawl in a direction opposite to that in which they are moved upon actuation of the crank by said conveyor cam; a ratchet rotatably mounted upon the other end plate for cooperation with said pawl, having an axially extending flange thereon and a removable cam carried on the peripheral surface of said flange; a vane movable in a direction parallel with the axis of said rockshaft and having a cam engageable by the removable cam, whereby said removable cam will move said vane at predetermined intervals; means actuated by such movement of said vane urging said retractable pin in the plunger arm into operable engagement with said tripping bar; a tripping lever pivotally affixed to the extended end of said tripping bar and extending towards the selector base plate at an acute angle to the tripping bar; a cam holding said tripping lever substantially in said position during a predetermined portion of the arc of movement of the extended end of said tripping bar and releasing it from such position at the end of such portion whereby overrunning of the free end of said tripping bar past a predetermined arcuate position is permitted; a slide member upon said base plate having means cooperable with said tripping lever when in said position and releasable therefrom when out of such position; and means operable by said slide member actuating said gate.

15. In a tablet making machine having a conveyor member carrying finished tablets, a pair of chutes receiving the tablets from said conveyor member, and a gate alternately extendible across the path of said tablets on said conveyor member for guiding them into one chute and retractable from such position to permit said tablets to enter said other chute, means for effecting the extension and retraction of said gate comprising: a frame comprising a pair of end plates, a mid-plate between said end plates and a base plate affixed perpendicularly to said end plates; a rockshaft rotatably supported upon bearings mounted within one end plate and said mid-plate and having a crank thereon adjacent to but outwardly from said end plate, and a conveyor cam on said conveyor member cooperating with said crank for moving it in one direction upon predetermined movement of said conveyor member; a tripping bar rotatably supported upon the bearing within said one end plate for rotatable movement with respect thereto and extending through the base plate to a point thereabove; a plunger arm affixed to said rockshaft for rotatable movement therewith and means on said plunger for engaging said tripping bar; a pawl mounted upon an arm affixed to said rockshaft for movement therewith and resilient means urging movement of said pawl and arm in a direction opposite to that in which they are moved upon actuation of the crank by said conveyor cam; a ratchet rotatably mounted upon the other end plate for cooperation with said pawl, having an axially extending flange thereon and a removable cam carried on the peripheral surface of said flange; a member movable in a direction parallel with said rockshaft and having a cam engageable by the removable cam, whereby said removable cam will move said member at predetermined intervals; means responsive to such movement of said member effecting operable connection between the plunger arm and said tripping bar whereby actuation of the crank will move said tripping bar; means operably connecting the extended end of said tripping bar with said gate in such a manner that uni-directional movement of said tripping bar will shift said gate from either position into its other position.

16. In a machine for discharging a conveyor-borne material from said conveyor selectively into one of a plurality of chutes and automatically shifting such discharge from one chute to another in response to movement of said conveyor, the combination comprising: means rotating a cam in response to the movement of said conveyor; means rotating a vane in response to movement of said conveyor, said vane being engageable and said vane being mounted for movement in a direction parallel with the rotational axis thereof by said cam at one point in the rotation of each; a tripping bar and means responsive to said axial movement of said vane effecting reciprocable movement of said tripping bar; a tripping lever pivotally supported upon said tripping bar and having a guide pin therein; a cam cooperable with said guide pin for holding said tripping lever in one position with respect to said tripping bar during one portion of the movement of said tripping bar, and for releasing said tripping lever from said one position during another portion of the movement of said tripping bar; a tripping pin and means supporting said pin for engagement and movement by said tripping lever while said tripping lever is in said one position, said engagement being terminated when said tripping lever is released from said position; and means responsive to the movement of said tripping pin effecting shifting of said discharge from one chute to another chute.

17. In a machine for automatically discharging a conveyor-borne material from a conveyor in response to movement of said conveyor, the combination comprising: an independently supported rockshaft and means thereon for oscillation thereof at predetermined intervals in response to movement of the conveyor; a first member rotatable by said rockshaft and a first cam carried thereon; a second rotatable member mounted for reciprocable movement in a direction substantially parallel with the rotational axis of said first member, and means rotatable by said rockshaft for rotating said second member; a second cam on said second member engageable by said first cam at predeterminable intervals for effecting said reciprocable movement of said second member; reciprocable guide means for selectively intercepting said material; and means responsive to the reciprocable movement of said second member effecting reciprocation of said reciprocable guide means.

18. In a machine having reciprocable means for selectively and automatically intercepting conveyor-borne material in response to movement of said conveyor, the combination comprising: an independently supported rockshaft and means mounted thereon actuable by means on said conveyor; a first member rotatable by said rockshaft and a cam carried thereon; a second rotatable member engageable by said cam at predeterminable intervals and reciprocably movable in a direction parallel with the axis of said rockshaft, means rotatable with said rockshaft for rotating said second member; and means responsive to the reciprocable movement of said second member effecting reciprocation of said reciprocable means.

LEONARD T. COOKSON.
WALTER G. KLETTKE.

REFERENCES CITED

The following references are of record in the file of this patent:

UNITED STATES PATENTS

| Number | Name | Date |
|---|---|---|
| 2,235,286 | Cookson | Mar. 18, 1941 |